Feb. 28, 1933.  W. M. SINGER  1,899,119

QUICK COUPLING DEVICE

Filed June 15, 1931  3 Sheets-Sheet 1

INVENTOR.
Walter M. Singer,
BY
ATTORNEYS.

Feb. 28, 1933.  W. M. SINGER  1,899,119

QUICK COUPLING DEVICE

Filed June 15, 1931   3 Sheets-Sheet 3

INVENTOR.
Walter M. Singer
BY
ATTORNEYS.

Patented Feb. 28, 1933

1,899,119

UNITED STATES PATENT OFFICE

WALTER M. SINGER, OF GLENDALE, CALIFORNIA

QUICK COUPLING DEVICE

Application filed June 15, 1931. Serial No. 544,308.

This invention relates to a coupling device for connecting together two fluid conducting conduit members such as sections of hose or pipe, or for connecting a hose to a faucet bib, tank or the like, or for connecting a closed cap on one of such fluid conducting members.

This application comprises a continuation in part of my pending application Ser. No. 473,069, filed August 4, 1930.

The principal object of the invention is to provide a coupling device which is of simple and sturdy construction, which permits quickly and easily connecting and disconnecting the two portions of the coupling device in a manner whereby neither portion is required to rotate with respect to the other during connection or disconnection, and which provides a perfectly tight seal against leakage of fluid when connected.

A particular object of the invention is to provide a coupling device having packing means on one coupling member adapted to engage a sealing member on the other coupling member, in which an air space is provided adjacent the packing means, substantially maintaining the fluid out of contact with said packing means when the coupling is in use.

A particular object of the invention is to provide a coupling device in which one of the coupling members may be inserted within the other, without resistance and hence without requiring the exertion of any force, to such position that the connection of the coupling members may be completed by a relative rotational movement of clamping means on one of said members, in such a manner that the portions of the coupling members attached to the respective fluid conduits have no relative rotative motion with respect to one another.

A further object of the present invention is to provide a coupling device having a single spring which resiliently resists movement of the rotatable clamping means disposed on one of the coupling members to connected position and which serves to resiliently lock the coupling members in said connected position and to maintain the sealing portions of the two coupling members in tight engagement.

A further object of the invention is to provide a coupling device provided with a yielding packing means of novel construction cooperating with the above mentioned spring to provide a fluid tight joint between the coupling members when in connected position.

A further object of the invention is to provide a coupling device in which the coupling members may be connected or disconnected by a relative rotation of the clamping means in either direction and in which positioning means are provided for maintaining the clamping means in clamping position against accidental displacement, and for preventing relative rotation of the clamping means beyond clamping position.

A further object of the invention is to provide a coupling device which is provided with air inlet means whereby air is admitted to within the coupling during the disconnection thereof after the pressure on the packing means is released and before the insertable portion of one coupling is completely withdrawn from the other coupling whereby the fluid contained in said coupling at the time of disconnection is replaced by air and allowed to drain therefrom, substantially eliminating spilling from the coupling during disconnection thereof.

A further object of the invention is to provide a device which offers definite advantages for use as an air, gas or vapor line connector in which two separate sealing members are provided in the one coupling, obtaining a gas-tight connection in which the possibility of scoring or abrasion of the packing members is avoided by providing connection of the coupling members without relative rotation of the respective seats and packing members, and which construction provides for positive alignment of the two members and obtains a uniform application of pressure on the respective sealing members.

Other objects and advantages of the invention will be pointed out hereinafter or will be apparent from the following descriptions of the construction and manipulation of several embodiments of the invention.

The coupling device of the present invention comprises two coupling members adapted to be secured in any suitable manner to hose, pipes or other conduit members which are to be connected together, said coupling members being provided respectively with cooperating sealing faces adapted to be brought into tight engagement upon movement of said coupling members toward one another. A rotatable collar element or housing is disposed on one of said coupling members in such manner as to force the same forwardly toward the other coupling member upon forward movement of said collar element, and said collar element and other coupling member are provided with inter-engaging clamping means adapted to effect forward movement thereof toward one another upon relative rotation of said collar element with respect to both coupling members. The clamping means on one of the parts may comprise inwardly projecting pins or lugs, and the clamping means on the other part may comprise outwardly projecting cam members provided with rearwardly inclined shoulders and with retaining depressions at the rearward ends of said shoulders, the cam members being spaced from one another so as to permit free insertion of the respective pins or lugs therebetween to a position opposite said inclined shoulders. In the preferred form of my invention, each of the cam members above mentioned is provided with two oppositely inclined rearwardly converging shoulders, said depression being disposed between the rear ends of said shoulders.

Means are also provided on one of said coupling members for resiliently resisting the relative movement of the rotatable collar element toward said other coupling member and for resiliently holding said sealing faces in tight engagement with one another. One of the coupling members is preferably provided with a yielding packing member whose forward face constitutes one of the above mentioned cooperating sealing faces, the other of said coupling members being provided with a seat adapted to engage said packing member and constituting the other of said sealing faces. If desired, a plurality of such packing members and sealing faces may be provided, adapted for simultaneous inter-engagement. In the preferred embodiment of the invention, as shown herein, a spring or resilient member is provided between said rotatable collar element and the coupling member on which said collar element is mounted, for providing the above mentioned resilient force resisting relative movement of said rotatable collar element toward the other coupling member and holding the sealing faces in tight engagement with one another. However, if desired, said spring or resilient member between the rotatable collar element and the coupling member may be omitted, and the yielding packing member or members may be made of resilient material, so as to constitute the resilient resisting and holding means above mentioned, and having sufficient resilience to provide the necessary resistance to inward movement of the rotatable collar element and hold said sealing faces in tight engagement.

Said one coupling member and rotatable collar element are also preferably provided with means, such as inter-engaging shoulders thereon, adapted to normally so position the sealing face on said one coupling member in relation to the clamping means on said collar element, when said coupling members are disengaged, as to permit said clamping means to be brought inwardly to position wholly opposite the clamping means on the other coupling member before said sealing face contacts the sealing face of said other coupling member, so that the entire compression of the resilient means for holding said sealing faces in tight engagement may be effected by the cam action produced by inter-engagement of said clamping means upon relative rotation of said collar element with respect to said other coupling member.

Further important features of the construction of the improved coupling device of this invention, and certain possible modification or illustrative embodiments thereof, can be best understood by reference to the accompanying drawings. Said drawings illustrate forms of coupling device according to the invention and referring thereto.

Referring to Figs. 1 to 7, the coupling device according to my invention may comprise two coupling members indicated in general at A and B. The coupling member B is shown as threadedly connectable to a fluid conduit member such as a pipe, or faucet bib 1, but it will be understood that either of said coupling members may, if desired, be formed as an integral part of a conduit member such as a pipe or faucet bib. Said coupling B is provided exteriorly with a plurality of annular cam members 2, comprising fixed clamping means, having their forward edges spaced from one another to provide an opening 3 and each provided with two oppositely inclined annular shoulders 2' and 2" (see Fig. 3) converging rearwardly, and with a depression 4 between the rear ends of said oppositely inclined shoulders and recessed forwardly therefrom. The body portion 5 of the coupling member B is recessed inwardly with respect to the cam members 2 rearwardly of said shoulders so as to permit free movement of the pins on the other coupling member over said shoulders.

Figure 1:
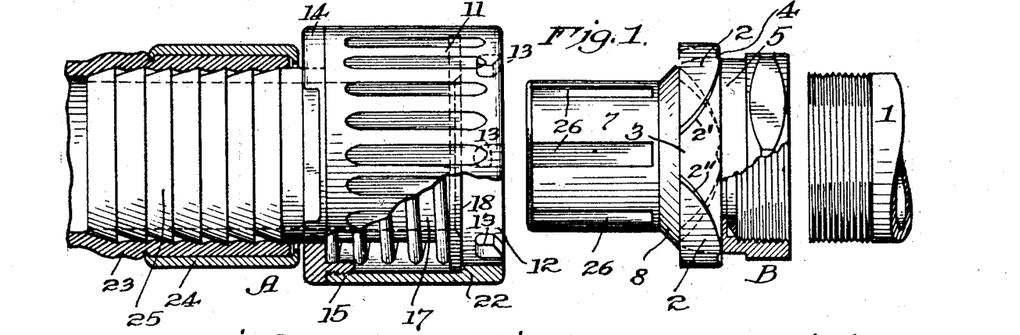
Fig. 1 is a side elevation of the two members of one form of the device completely disconnected from one another, with the outer portions of each member partly broken away.

The coupling member B is further provided with an axially projecting tubular portion 6 provided with an externally threaded end 6' adapted to receive an internally threaded tube 7. A rearwardly and outwardly flared packing member 8, of rubber, rubber containing composition, leather or other yielding material or composition of suitable characteristics for use with any particular fluid, is firmly positioned around the portion 6 with its rearward end engaged in a recessed groove 9 provided in the forward end of body portion 5 concentric with the tubular portion 6, and with its forward end in contact with a shoulder 7' at the rear end of the tube 7, said packing member being of such shape and dimensions that the tube 7 exerts a slight positioning compression on said packing member when said tube has been screwed on the portion 6 until the shoulder 7" is in engagement with the forward end of the portion 6. Both the forward and rear faces of packing member 8 are flared or inclined outwardly and rearwardly as shown at 8' and 8" respectively, so that an annular space 10 is provided rearwardly of said packing member into which said member may be resiliently deformed during seating engagement with the other coupling member, as will be hereinafter more fully described.

The outer face of tube 7 on the coupling member B is preferably provided with a plurality of longitudinal air admitting grooves 26 which preferably extend from a point somewhat removed from the packing member 8 to the forward end of said tube and which have a particular function during the disconnection of the coupling device when a fluid is contained therein, as will be subsequently pointed out.

The other coupling member A comprises a sleeve 17 adapted to slidably fit around the tube 7 of the other coupling member and provided at its forward end with a flange 18 serving as a sealing member and provided with a flared seat or sealing face 19 adapted to engage the forward sealing face 8' of packing member 8 of the other coupling member. Said seat is shown as inclined inwardly and rearwardly and of such shape as to form a fluid tight seal with the packing member 8 when in compressing engagement therewith. Coupling member A is also provided with a cylindrical outer housing or collar 11 rotatably and slidably disposed around the sleeve 17 and having a recess 12 of sufficient diameter to slip over the cam members 2 of the first named coupling member and provided with a plurality of inwardly projecting pins or lugs 13 comprising rotatable clamping means, corresponding in number and spacing to the cam members 2 and adapted to pass through the openings 3 above mentioned and to engage the inclined shoulders 2' or 2" upon relative rotation of said housing with respect to the other coupling member B. The rear end of housing 11 is closed by a plate or disc 14 removably secured thereto as by means of coacting threaded portions on said plate and said housing as at 15. Said plate 14 is provided with a central opening 16 through which the sleeve 17 slidably and rotatably extends.

A compression spring 21 of suitable strength is provided between end plate 14 and flange 18, and forward movement of said flange by said spring, when the coupling members are disconnected, is limited by an inwardly projecting shoulder 22 on the housing 11, the rearward portion 11' of said housing being of somewhat greater internal diameter than the portion thereof forwardly of said shoulder. Said shoulder is spaced rearwardly from the pins or lugs 13 by a distance such that when sealing flange 18 is in engagement with said shoulder the distance, axially of the coupling members, from the rear edge of the pins or lugs 13 to seat 19 is somewhat greater than the distance, longitudinally of the coupling members, from the face of packing member 8 to the forward edge of shoulders 2' and 2'', so as to permit partial insertion of the coupling member B in the coupling member A to permit said pins or lugs to pass through the openings 3 into position opposite the inclined shoulders 2' and 2'' before the packing member 8 is brought into engagement with the seat 19 on flange 18, this position of partial insertion being indicated in Fig. 2.

In the preferred form of device three sets of cam members and three pins are respectively provided on the coupling members, obtaining a uniform distribution of pressure on the packing member 8 by virtue of the inherent stability of a three-point suspension. With this type of construction, side pressure of the tube 7 on the interior of sleeve 17 is avoided and maximum cooperation of the separate parts is obtained.

The coupling member A may be connected in any suitable manner to a pipe, hose, or other fluid conducting member indicated at 23. Said connection is shown in Fig. 1 as being effected by means of the sleeve 17 above mentioned. The member 23 is shown as a flexible hose, and the end thereof may be clamped by the clamping collar 24 into tight engagement with the annular ribs or projections 25 on the rear end of said sleeve, although any other suitable means of connecting a flexible hose to an internal sleeve may be employed.

In connecting the above described coupling device the members A and B are first moved longitudinally toward one another, and the coupling member B is partially inserted in the coupling member A, the tube 7 entering the sleeve 17 and the cam members 2 entering the recess 12 in the housing 11. In this movement the pins 13 must be aligned with the openings 3, so that said pins may be caused to pass through said openings opposite the inclined shoulders 2' and 2''. It will be evident from Fig. 2 that the members may be brought to this position before the packing member 8 is brought into compressional engagement with its seat 19, and hence without encountering any resistance and without requiring the exertion of any appreciable inward pressure or force over that required to overcome the slight frictional drag of the tube 7 on the sleeve 17.

Figures 2, 3, 4, 5, 6, 7:
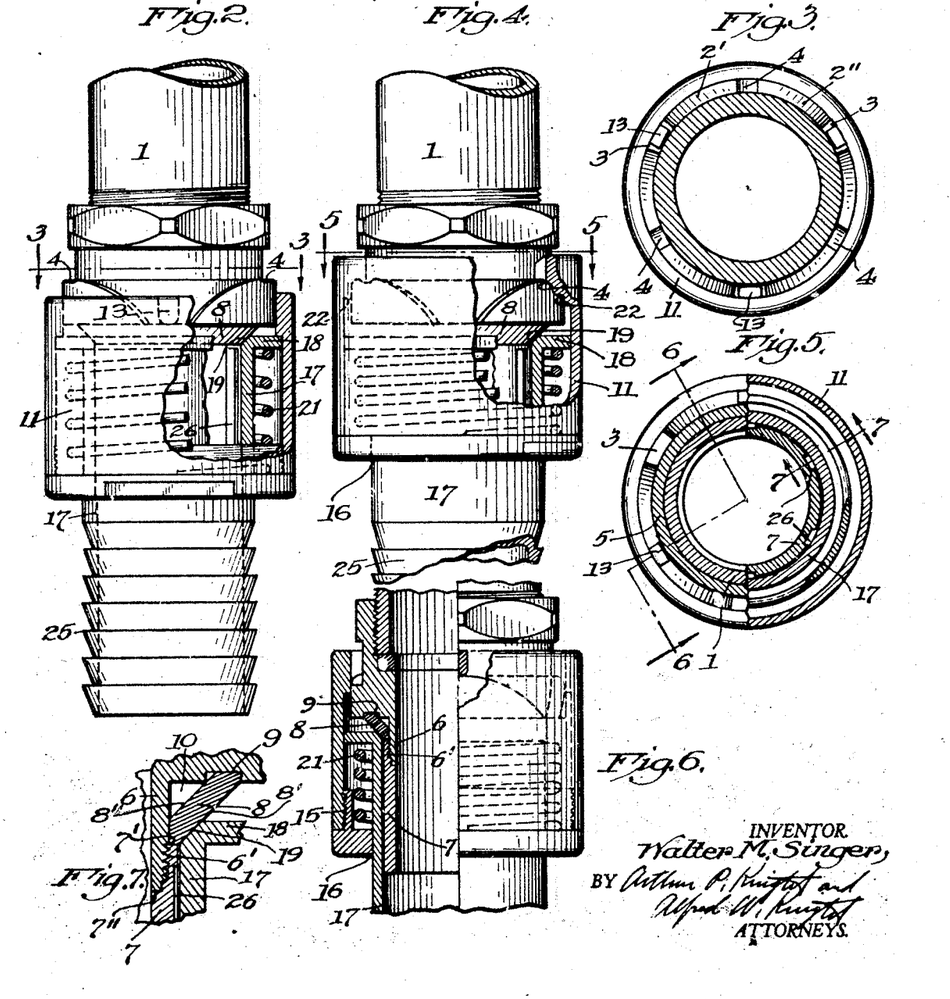
Fig. 2 is a partly sectional side view of the above device with one member inserted within the other in position to be connected.
Fig. 3 is a section thereof on line 3—3 in Fig. 2.
Fig. 4 is a partly sectional side view of the device shown in Fig. 2, in which the members are connected to each other.
Fig. 5 is a section thereof on line 5—5 in Fig. 4.
Fig. 6 is a partly sectional view of the form of device as shown in Fig. 4, taken on line 6—6 in Fig. 5.
Fig. 7 is a sectional detail of a portion of the device taken on line 7—7 in Fig. 5.

After the coupling members have been brought to this position of partial insertion, it is merely necessary to rotate the housing 11 relative to the member B a slight amount in either direction, whereupon the pins 13 engage the inclined shoulders 2' or 2'' of the respective cam members, depending upon the direction of such relative rotation. In either event, the engagement of said pins with said shoulders causes the coupling members to be drawn inwardly toward one another, compressing the spring 21 between end plate 14 and also compressing the packing member 8 against the seat 19 as the housing 11 is drawn longitudinally by the action of the cam 2. When the pins 13 reach the rearward ends of the respective shoulders, upon a total rotation of approximately one-sixth revolution, they snap into the depressions 4, as shown in Fig. 4, and are resiliently held therein by means of spring 21 so as to lock the parts in connected position. The depressions also serve to prevent turning of the housing 11 beyond proper clamping position even in case the exertion of a considerable force is required to complete the movement of said housing to this position. As the spring 21 forces the seat 19 of the flange 18 into engagement with the packing member 8, said packing member is crowded into firmer contact with member B in the groove 9 and may be resiliently deformed into the space 10, whereby the packing member may accommodate itself to any slight eccentricities in the seat surface or vice versa and provide a fluid tight joint therebetween.

It is to be noted that the collar or housing 11 is rotatable with respect to sleeve 17. As long as the flange 18 is held by spring 21 in engagement with shoulder 22, the friction therebetween opposes a certain resistance to relative rotation of these two parts. However, when the packing member 8 and seat 19 are brought into engagement, and the rotation of housing 11 is begun, the movement of said housing toward the other coupling member causes the shoulder 22 to be moved away from flange 18 and at the same time acts through spring 21 to resiliently press the seat 19 and packing member 8 into tight engagement. Therefore, throughout substantially the entire rotative clamping operation the two coupling members to which the respective fluid conduits are connected are not required to turn relative to one another, but the housing 11 turns freely about the sleeve 17. Wear on the packing member due to rotation of the seat 19 in contact therewith is thus substantially eliminated or reduced to a minimum.

In the event that an extreme side pull is exerted on the hose or pipe attached to the coupling member A, tending to pull one side of the flange 18 away from the packing member 8, due to any clearance between 7 and 17, the resilience of said member 8 is sufficient to maintain a fluid tight contact between said member and the seat 19. The tube 7 is preferably of such a size that it will fit snugly within the sleeve 17 and is preferably of sufficient length to preserve the coupling in substantial axial alignment with one another.

In practice only sufficient clearance is provided between the tube 7 and the sleeve 17 to allow of easy insertion of said tube in said sleeve.

When the coupling members are in connected relation to each other, any fluid which may be passed through the device is prevented from contacting the packing means 8 by the presence of a ring of entrapped air disposed between the tube 7 and sleeve 17 in close proximity to the packing member 8. This air ring effectively protects the packing member from attack by the liquid which may come in contact with the packing member when connection is broken between the coupling members, and may ordinarily, be wiped away from said packing member.

When certain liquids, such as gasoline, lubricating oil, or the like are to be conducted through a coupling of the above described type, a resilient rubber or rubber composition packing member would not offer particularly good service by reason of the susceptibility of rubber to decomposition in contact with hydrocarbon oils, and since, even with the provision of an air seal between the fluid and the packing member, some fluid must inevitably come in contact with the packing member during disconnection of the device. I provide a construction whereby the packing member is of such shape and disposition that it may be made of a material such as leather which will withstand attack of hydrocarbon oils and which, while having relatively little inherent resilience, still has sufficient resilience to provde a fluid tight seal, by reason of such shape.

By reason of the above provisions of an air seal and a resilient packing member of the above general type, a packing means is provided which gives good service over an unusually long period under the most severe operating condition.

Disconnection of the coupling members may be quickly and easily accomplished by merely rotating the housing 11 in either direction relative to the coupling members with sufficient force to dislodge the pins or lugs 13 from the depressions 4, and continuing such relative rotation until said pins are aligned with the openings 3 and then withdrawing the coupling members from engagement with one another, and during said withdrawal, assuming the coupling to be disposed adjacent a closed valve mechanism and at a higher level than the other end of the hose to which it is connected, air will be admitted to within the sleeve 18 through the grooves 26 in the tube 7 as soon as the packing member is moved away from engagement with the seat 19 sufficiently to cause the rear ends of grooves 26 to pass seat 19, allowing any liquid entrapped within tube 7 or sleeve 17 to be replaced with air and run out through the hose so that when complete disconnection of the coupling is attained, there will be no fluid present therein to spill therefrom.

One of the principal applications of my device is in connection with gasoline tank trucks wherein the coupling member B is attached to the valved tank discharge on the truck and the coupling member A is attached to a delivery hose through which the contents of the truck tank may be discharged to a receptacle set at a lower level than the tank discharge. It is obvious that any gasoline spilled from the hose during disconnection thereof from the truck would be highly dangerous as well as wasteful and with the above described device such an eventuality is precluded. The above described device is also of considerable utility for use as a conduit connector in the handling of costly or corrosive liquids wherein a "drip-proof" quick operating connection device would be of paramount desirability.

Figure 9:
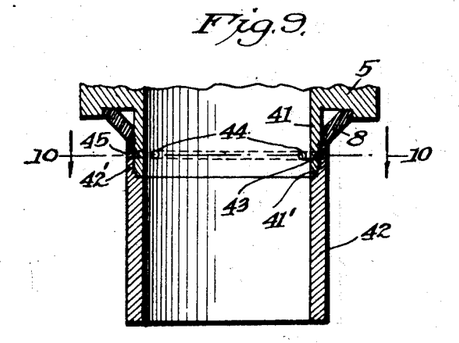
Fig. 9 is a section of a form of male member of a coupling device provided with an alternate form of air admitting means.
Figure 10:
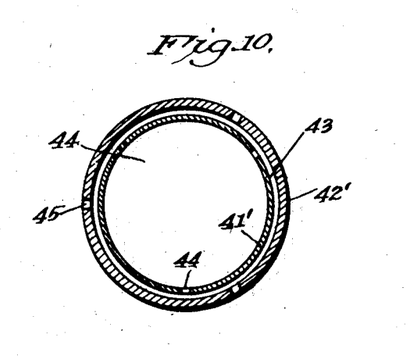
Fig. 10 is a transverse section thereof on line 10—10 in Fig. 9.

The form of coupling member shown in Figs. 9 and 10, corresponding to coupling member B, Fig. 1, may comprise a body portion 5 provided with a projecting tubular portion 41 (corresponding to 6, Fig. 1) provided with a threaded end portion 41' adapted to receive the coactingly threaded portion 42' of the tube 42 (corresponding to the tube 7, Fig. 1), said portion 41 being provided with an annular groove 43 in its threaded portion adapted to form an annular space extending around inside the threaded portion of the tube 42 when said portion 42 is completely screwed in place on said portion 41, said portion 41 being provided with a plurality of openings 44 in the side wall communicating with said groove 43 and said tube 42 being provided with a plurality of similar openings 45 in position to communicate with said groove when the parts are in assembled position as shown. The above openings and annular space serve to allow access of air to the interior of the tube 42 for permitting drainage of liquid from the interior of the coupling, when a coupling member of this type is withdrawn from a coacting coupling member A, after the manner of the operation of the grooves 26 above described.

Figure 11:
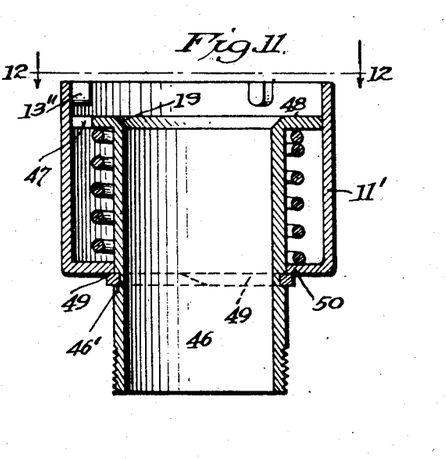
Fig. 11 is a sectional view of an alternate form of female member of a coupling device of this invention.
Figure 12:
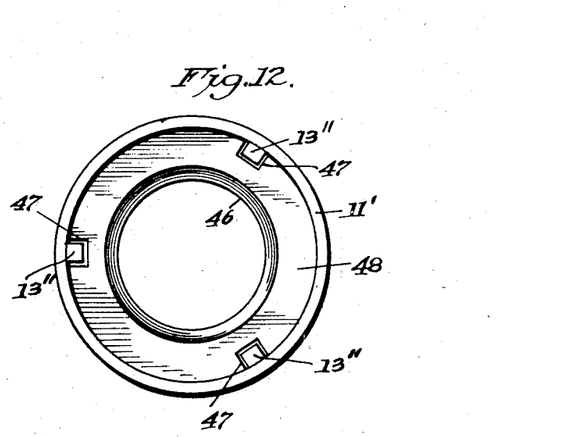
Fig. 12 is a transverse section thereof on line 12—12 in Fig. 11.

The form of coupling member shown in Figs. 11 and 12, corresponding to coupling member A, Fig. 1, may comprise one in which the central sleeve 46 may be inserted from the forward end of the housing 11' which is in this case provided with an integral rear end plate 50, slots 47 being provided in the periphery of the flange portion 48, corresponding in number and spacing to the pins or lugs 13'' disposed on the housing 11' in order to permit said flange to pass said pins or lugs. Said sleeve 46 is provided with an annular recess 46' into which may be inserted a split-ring 49 after the sleeve is inserted within the housing 11', said slot 46' being preferably so located that when the ring 49 is in engagement with the rear end plate 50 of the housing 11' the flange 48 is disposed somewhat to the rear of the rearward edges of the pins or lugs 13'', so as to provide the same relationship as before between the longitudinal positioning of said pins or lugs and the sealing seat 19' on sleeve 46, for the purpose of permitting said pins or lugs to be moved inwardly past the forward ends of the cam shoulders on the other coupling member, as above described.

Figure 13:
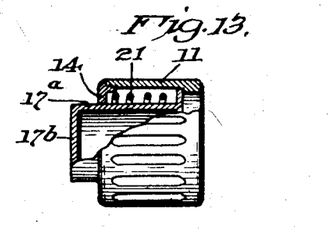
Fig. 13 is a partly sectional view of a coupling cap according to my invention.
Figure 14:
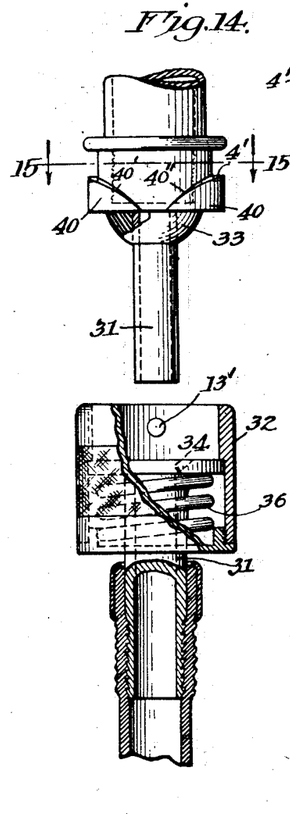
Fig. 14 is a side elevation of the two members of an alternative form of device completely disconnected from one another, with the outer portion of one member partly broken away.
Figure 15:
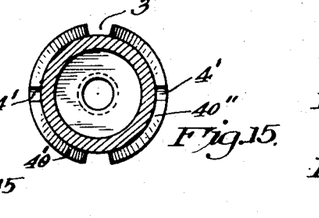
Fig. 15 is a transverse section thereof on line 15—15 in Fig. 14.
Figure 16:
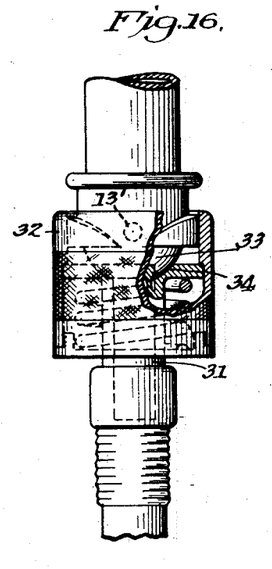
Fig. 16 is a partly sectional side view of the form of device shown in Fig. 14 with one member inserted within the other in position to be connected.
Figure 17:
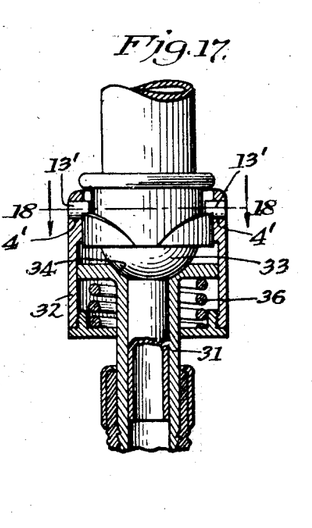
Fig. 17 is a partly sectional view of the above with the members in connected position.
Figure 18:
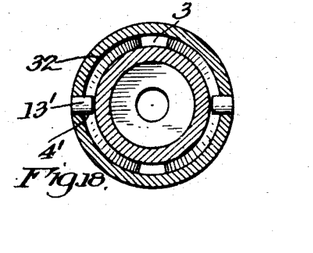
Fig. 18 is a transverse section thereof on line 18—18 in Fig. 17.

Fig. 13 illustrates a form of coupling cap which may be connected to a coupling member such as B, Fig. 1 and effectively close the same. Such a coupling cap may comprise a coupling member of the type shown at A, Fig. 1, in which the central sleeve 17 is replaced with a sleeve 17a provided with a closed end 17b. Such a cap device is intended for use when a hose or other conduit provided with a coupling according to this invention is disconnected from the other coupling member and where it is desired to provide a positive closure at such times; for example, when the delivery hose is disconnected from the discharge bib of a gasoline truck tank.

Figure 8:
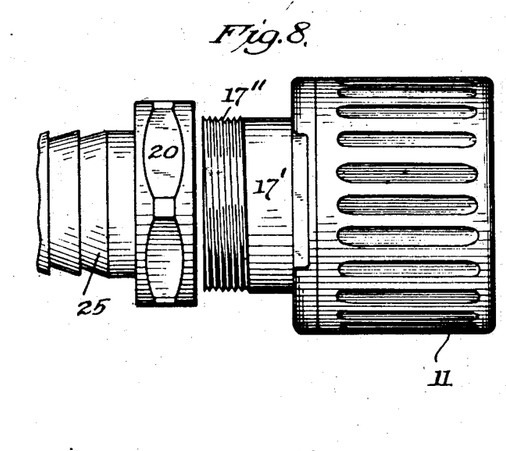
Fig. 8 is a side elevation of a coupling provided with a threaded end adapted to receive a threaded fitting.

The above described forms of my device are designed for general commercial uses in which a heavy duty type of connector is desirable. The particular construction shown is intended only for the purpose of illustrating the essential features of the invention, and it will be understood that numerous modifications may be made in the exact construction, and particularly that the disposition of the pins and the cam members, as well as the packing member and the sealing member resiliently held in engagement therewith, may be relatively reversed with respect to the two coupling members, if desired, without departing from my invention. In some cases it is preferred that a threaded connection be provided for each member of the coupling and there is illustrated in Fig. 8, one member of my coupling, similar to "A", Fig. 1, in which the sleeve 17 has been replaced with a similarly flanged sleeve 17' having a threaded end 17'' adapted to receive a threaded coupling 20 of a conventional type.

In Figs. 14 to 18 there is illustrated a modified form of quick operating coupling device which is adapted for light service, such as garden hose, laundry connections and the like. As shown in the above illustrations, the tube 31 may be made integral with one coupling member, replacing the tube 7 and threaded portion 6 (Fig. 6) of the first described form of device. The tube 31 may, in this case be made proportionally longer and but two pins 13' and two cams 40 with inclined shoulders 40' and 40'' corresponding to 2' and 2'', Fig. 1, be provided to accomplish the locking of the two members in connected position. The device also comprises, as before, rotatable housing or collar 32 on one of the coupling members and a compression spring 36 serving to hold said collar in locking position. In this case also, no rotation of one member in relation to the other member is necessary, as the connection is provided by the rotation of the housing 32 which avoids any twisting of the attached hose during connection of the two coupling members. For this reason there is no scoring or damage to the packing member due to the rotation of the seating member thereon, the packing member being subjected solely to straight compressional engagement with said seating member.

The device illustrated in Figs. 14 to 18 is shown as provided with a convex surfaced packing member 33 on one coupling member in frictional engagement with the tube 31 and an inwardly and rearwardly inclined seat 34 on the other coupling member, of concave curvature so as to fit snugly against the packing member throughout the depth of said seat.

The above described device is locked in connected position by a quarter turn of the housing 32 in respect to the other coupling member, the pins 13' engaging the depressions 4' as before.

Figure 19:
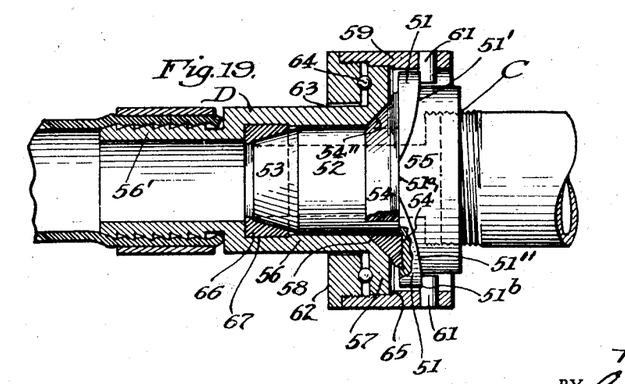
Fig. 19 is a partly sectional view of another form of the device, showing the male member in elevation and the female member in section, said two members being in connected relation.

The form of device illustrated in Fig. 19 is particularly adapted for use in the connection of air, gas and vapor lines and may comprise a male coupling member C and a female coupling member D. The coupling member C may comprise a body portion 55, provided with a plurality of projecting annular cam members 51, comprising fixed clamping means, each of said cam members having their forward edges spaced from one another to provide an opening 51a and each provided with two oppositely and rearwardly converging shoulders 51' and 51'' similar to those shown in Figs. 1 to 6 at 2' and 2'', and with a depression 51b between the rear ends of said oppositely inclined shoulders and recessed forwardly therefrom. The coupling member C is also provided with a projecting tubular portion 52 having a tapered end portion 53 and a resilient packing member 54 preferably of rubber, of substantially triangular cross-section as shown, disposed around said tubular portion 52 adjacent the body portion 55 and preferably engaged in an annular recess 54' in said body member, or the packing member may, if desired, be of such shape and of such disposition as shown at 8, Figs. 1 to 7.

The coupling member D may comprise a sleeve 56 adapted to slidably fit around the tubular portion 52 of the other coupling member and provided with a flange 57 at its forward end, said flange being provided with a flared seat 58 adapted to engage the forward face 54″ of packing member 54 of the other coupling member. Coupling member D is also provided with a cylindrical outer housing or collar 59 rotatably disposed around the periphery of the flange 57 and of such an interior diameter as to slip over the cam members 51 of the coupling member C and provided with a plurality of inwardly projecting pins or lugs 61 comprising rotatable clamping means, said pins or lugs corresponding in number and spacing to the cam members 51 and adapted to pass through the openings 51a between said cam members and engage the inclined shoulders 51′ or 51″ upon relative rotation of said housing with respect to the coupling member C. The rear end of the housing 59 is closed by a plate or disc 62 threadedly secured to the housing 59 and provided with a central opening 63 through which the sleeve 56 slidably and rotatably extends. A ball thrust bearing 64 may, if desired, be provided between the plate 62 and the flange 57 and forward movement of said flange is limited by an inwardly projecting shoulder 65 on the housing 59. A resilient packing member 66 is provided in a recessed portion 67 in the interior of the sleeve 56 to be engaged by the tapered portion 53 of the coupling member C which acts as a seat therefor. The rearward end 56′ of the sleeve 56 may be provided with any suitable form of hose or pipe connecting device, according to the use to which the coupling member is to be put.

Connection of the coupling members C and D is accomplished in a manner similar to that described above, in which the member C is inserted within the member D and the housing 59 is rotated with respect to the coupling member C so as to cause the pins to ride upon the rearward shoulders of the cam 51 and force the packing members 54 and 66 into contact with their respective seats 58 and 53. The rotation of the housing is stopped when the pins 61 drop into the depressions 51b and in this position the seat 58 is pressed into contact with the packing member 54, deforming the same to some extent, as shown, and the tapered portion 53 is forced into seating engagement with the packing member 66 in the member D. It will be understood that the distance, longitudinally, from the rearward surface of the pins 61 to the seat 58 is but slightly less than the distance from the bottom of the depressions 51b to the normal, undeformed, face position of the packing member 54 as the longitudinal movement of the flange 57 toward the coupling D after the seat 58 has come in contact with the packing member 54 is limited by the degree of resilience of the packing members. Further, the depressions 51b are preferably quite shallow so that the seat 58 is moved rearwardly but a short distance as the pins 61 drop off the cam shoulders into the depressions, so that the respective seats and packing members are positioned in tight engagement when said pins are resting in said depressions. The ball thrust bearing between the plate 62 and the flange 57 provides for easy rotation of the housing 59 during the connecting or disconnecting operation and allows such connection or disconnection of the coupling without any rotation of the respective coupling members.

Disconnection of the coupling is obtained by a rotation of the housing 59 in either direction, forcing the pins 61 away from the depressions 51b and along the cam shoulders to the openings 51a in which position the respective members may be disconnected.

I claim:

1. A coupling device comprising two coupling members, one of which is provided with relatively rotatable clamping means and the other of which is provided with relatively fixed clamping means, one of said clamping means being provided with a plurality of projections and the other of said clamping means being provided with a plurality of cam members spaced from one another by a distance somewhat greater than the width of said projections, said cam members being adapted to engage said projections upon relative rotation of said rotatable clamping means with respect to said other coupling member to effect relative movement of said rotatable clamping means inwardly toward said other coupling member, said rotatable clamping means comprising a housing, and said one coupling member comprising a sealing member slidably mounted within said housing, and a spring tending to move said sealing member forwardly in said housing, the other of said coupling members comprising a body portion adapted to be inserted within said housing and a yielding packing member adapted to engage said sealing member upon said relative inward movement of said rotatable clamping member.

2. A coupling device as set forth in claim 1, said housing being provided with an internal shoulder adapted to limit forward movement of said sealing member, said shoulder being so positioned that the relatively fixed clamping means and the relatively rotatable clamping means may be brought to position with said projections wholly opposite said cam members before said packing member contacts said sealing member.

3. A coupling device as set forth in claim 1, each of said cam members having two oppositely inclined rearwardly disposed converging shoulders and a depression between the rear ends of said shoulders adapted to engage a corresponding projection of the other clamping means upon completion of the relative rotation of the rotatable clamping means in either direction to clamping position and said spring resiliently positioning each of said projections in the corresponding depression upon such completion of such relative motion.

4. A coupling device as set forth in claim 1, said one coupling member being also provided with a central sleeve extending rearwardly from said sealing member and said other coupling member being provided with a projecting central tube adapted to fit within said sleeve.

5. A coupling device comprising two coupling members, one of which is provided with relatively rotatable clamping means and the other of which is provided with relatively fixed clamping means, said relatively rotatable and said relatively fixed clamping means coacting to produce a relative inward movement of said rotatable clamping means with said other coupling member upon relative rotation of said rotatable clamping means with respect to said relatively fixed clamping means, said rotatable clamping means comprising a housing, and said one coupling member comprising an axially disposed sleeve slidably mounted within said housing and a sealing member adjacent the forward end of said sleeve, a spring tending to move said sleeve and said sealing member forwardly in said housing, an internal shoulder on said housing adapted to engage said sealing member and limit such forward movement of said sleeve and seating member in said housing, the other of said coupling members comprising a body portion adapted to be inserted within said housing and having an axially projecting tubular portion provided with a threaded end, a coactingly threaded projecting tube secured to said threaded end and adapted to fit within said sleeve on said one coupling member, a flared resilient packing member disposed around said projecting tubular portion between the rearward end of said projecting tube and said body portion and adapted to be brought in tight engagement with said sealing member upon said relative inward movement of rotatable clamping means with respect to said other coupling member.

6. A coupling device as set forth in claim 5, one of said clamping means being provided with a plurality of projections and the other of said clamping means being provided with a plurality of cam members, each of said cam members having two oppositely inclined rearwardly converging shoulders and a depression between the rear ends of said shoulders adapted to engage a corresponding projection of the other clamping means upon completion of the relative rotation of the rotatable clamping means in either direction to clamping position and said spring resiliently positioning each of said projections in the corresponding depression upon such completion of such relative rotation and said internal shoulder of said housing being so positioned that the relatively fixed clamping means and the relatively rotatable clamping means may be brought to position with said projections wholly opposite said cam members before said packing member contacts said sealing member.

7. A coupling device as set forth in claim 5, said flared resilient packing member having its inner surface at its forward end portion in concentric contact with said projecting tubular portion, a concentric groove on the forward end of said other coupling member body portion rearwardly of the forward end of said projecting tubular portion adapted to receive and position the rearward flared end of said packing member, and said projecting tube having a shoulder at its inner end adapted to engage the forward end of said packing member and force said packing member into firm contact with said body portion of said other coupling member in said groove when said projecting tube is completely screwed on said projecting tubular position of said other coupling member.

8. A coupling device as set forth in claim 5, said projecting tube having a plurality of longitudinal air admitting grooves disposed on the exterior surface thereof.

9. A coupling device as set forth in claim 5, said packing means being so shaped as to provide an annular space between the inner portion of the rear surface of said packing member and the forward end of said body portion and being resiliently rearwardly deformable into said space upon forcible contact of said sealing member therewith.

10. In a coupling device, a coupling member having a body portion provided with an axially projecting tubular extension, a resilient packing member surrounding said tubular extension adjacent said body portion and engaging the forward end of said body portion and a tube threadedly mounted on said tubular extension and having a shoulder engaging said packing member holding said member tightly against said forward end of said body portion.

11. In a coupling device a coupling member having a body portion provided with an axially projecting tubular extension and having a groove disposed around said tubular extension and concentric therewith, a flared resilient packing member surrounding said tubular extension and having its forward end portion in concentric contact with said tubular extension and its rearwardly and outwardly flared rear end portion disposed in said groove, and a tube threadedly mounted on said tubular extension and having a shoulder engaging said packing member holding said member tightly against said forward end of said body portion in said groove, said packing member being so shaped as to provide an annular space between the inner portion of the rear surface of said packing member and the forward end of said body portion and resiliently deformable rearwardly into said space, said tube having an internal shoulder adapted to engage the forward end of said tubular extension so as to limit the degree of compression of said packing member by said first named shoulder.

12. A coupling device comprising two coupling members, one of which comprises a sleeve and sealing means at the forward end of said sleeve and the other of which comprises a body portion having a tubular extension adapted to fit slidingly within said sleeve and packing means around said tubular extension abutting said body portion and adapted to engage said sealing means and relatively fixed and rotatable clamping means on said coupling members adapted to clamp said coupling members in position with said packing means in engagement with said sealing means, said tubular extension fitting sufficiently closely within said sleeve to substantially prevent access of fluid therebetween to said packing means and being provided with means for admitting air to the interior of tubular extension and sleeve upon a slight movement of said packing member away from said seat during disconnection of said coupling members.

13. A coupling device as set forth in claim 12, said air admitting means comprising a plurality of grooves on the outer face of said tubular extension and extending from the forward end thereof to within a short distance of said packing means but terminating somewhat forwardly of said packing means.

14. A coupling device comprising two coupling members, one of which comprises a body portion having a tubular extension provided with sealing means at the forward end thereof and packing means around the rearward portion of said extension and abutting said body portion and the other of which comprises a sleeve and sealing means at the forward end of said sleeve adapted to engage said packing means and packing means disposed interiorly of said sleeve rearwardly of said last named sealing means adapted to engage said first named sealing means coincidently with the engagement of said second named sealing means with said first named packing means, and relatively fixed clamping means on one of said members and rotatable clamping means on the other of said coupling members adapted to clamp said coupling members in position with said packing means in engagement with said sealing means upon rotation of said rotatable clamping means with respect to both of said members.

15. A coupling device comprising two coupling members, one of which comprises a body portion having a tubular extension and resilient packing means around said tubular extension and abutting said body portion, and the other of which comprises a sleeve adapted to fit around said tubular extension and provided at its forward end with sealing means adapted to engage said packing means, relatively fixed clamping means on one of said coupling members, and rotatable clamping means on the other coupling member adapted to exert a forward thrust thereon, said fixed and rotatable clamping means being operable upon rotation of said last named clamping means relative to both coupling members to draw said coupling members together and clamp the same in position with said sealing means in engagement with said packing means, the resilience of said packing means serving to permit said coupling members to be drawn together.

16. A coupling device comprising two coupling members provided respectively with cooperating sealing faces adapted to be brought into tight engagement upon movement of said coupling members toward one another, a rotatable housing disposed on one of said coupling members and operatively connected thereto in such manner as to force the same forwardly toward the other coupling member upon forward movement of said housing, said housing and other coupling member being provided with inter-engaging clamping means adapted to effect forward movement thereof toward one another upon relative rotation of said housing with respect to both coupling members, means on one of said coupling members for resiliently resisting the relative movement of the rotatable housing toward said other coupling member and for resiliently holding said sealing faces in tight engagement with one another, and said one coupling member and said rotatable housing being provided with inter-engaging shoulder means adapted, when said two coupling members are disengaged, to so position the sealing face of said one coupling member in relation to the clamping means on said housing as to permit said clamping means to be brought inwardly to position wholly opposite the clamping means on the other coupling member before the respective sealing faces are brought into engagement.

17. A coupling device as set forth in claim 16, said one coupling member being also provided with a central sleeve extending rearwardly from said sealing face thereof and said other coupling member being provided with a projecting central tube adapted to fit within said sleeve.

In testimony whereof I have hereunto subscribed my name this 1st day of June, 1931.

WALTER M. SINGER.